US012588596B2

(12) United States Patent
Geng et al.

(10) Patent No.: US 12,588,596 B2
(45) Date of Patent: Mar. 31, 2026

(54) CORN EAR PICKING ROLLER STRUCTURE FOR STRENGTHENING STEM GRABBING

(71) Applicant: SHANDONG UNIVERSITY OF TECHNOLOGY, Zibo (CN)

(72) Inventors: Duanyang Geng, Zibo (CN); Xiang Li, Zibo (CN); Jida Wu, Zibo (CN); Chengqian Jin, Zibo (CN); Yanchun Yao, Zibo (CN); Xiang Yin, Zibo (CN); Bolong Wang, Zibo (CN)

(73) Assignee: SHANDONG UNIVERSITY OF TECHNOLOGY, Zibo (CN)

( * ) Notice: Subject to any disclaimer, the term of this patent is extended or adjusted under 35 U.S.C. 154(b) by 365 days.

(21) Appl. No.: 18/243,123

(22) Filed: Sep. 7, 2023

(65) Prior Publication Data

US 2024/0008406 A1 Jan. 11, 2024

Related U.S. Application Data

(63) Continuation of application No. PCT/CN2023/087258, filed on Apr. 10, 2023.

(30) Foreign Application Priority Data

Jul. 5, 2022 (CN) .......................... 202210782371.4

(51) Int. Cl.
*A01D 45/02* (2006.01)

(52) U.S. Cl.
CPC .......... *A01D 45/025* (2013.01); *A01D 45/023* (2013.01)

(58) Field of Classification Search
CPC .............................. A01D 45/025; A01D 45/023
See application file for complete search history.

(56) References Cited

U.S. PATENT DOCUMENTS 923,806 A * 6/1909 Boda .................... A01D 45/025
56/107
3,127,723 A 4/1964 Procter et al.
(Continued)

FOREIGN PATENT DOCUMENTS

CN 203872594 U 10/2014
CN 106358587 A 2/2017
(Continued)

OTHER PUBLICATIONS

Geng Duanyang, et al., Design and Experiment of Corn Harvester Polygonal Vertical-rollers Snapping Means, Journal of Agricultural Machinery, 2017, pp. 84-91, vol. 48 No. 3.

*Primary Examiner* — Arpad Fabian-Kovacs
(74) *Attorney, Agent, or Firm* — Bayramoglu Law Offices LLC

(57) ABSTRACT

A corn ear picking roller structure for strengthening stem grabbing includes a header, a seedling divider, a seedling pulling chain, a clamping chain, a seedling pressing plate, and an ear picking device. The seedling divider is connected to a front end of the header, the seedling pulling chain is connected to the header and located on a lower side of the seedling divider, the clamping chain is connected to the header and located on a lower portion of the seedling pulling chain, the ear picking device is connected to the header and located on one side of the seedling divider, and the seedling pressing plate is connected to a top end of the ear picking device. The ear picking device includes a left ear picking roller and a right ear picking roller, and each of the left and right ear picking rollers is provided with an inequilateral multi-edge structure.

5 Claims, 4 Drawing Sheets

(56) References Cited

U.S. PATENT DOCUMENTS

| | | | | |
|---|---|---|---|---|
| 7,886,510 B2 * | 2/2011 | Calmer | ............... | A01D 45/025 |
| | | | | 56/103 |
| 11,071,252 B2 * | 7/2021 | Calmer | ............... | A01D 45/025 |
| 11,533,849 B2 * | 12/2022 | Tiessen | ............... | A01D 45/025 |
| D1,023,700 S * | 4/2024 | Calmer | ............... | A01D 45/025 |
| | | | | D8/7 |
| 12,010,949 B2 * | 6/2024 | Calmer | ............... | A01D 45/025 |
| 12,279,558 B2 * | 4/2025 | Calmer | ............... | A01D 45/025 |
| 2004/0016219 A1 * | 1/2004 | Calmer | ............... | A01D 45/025 |
| | | | | 56/51 |
| 2007/0266689 A1 * | 11/2007 | Calmer | ............... | A01D 45/025 |
| | | | | 56/62 |
| 2015/0319926 A1 * | 11/2015 | Madheswaran | ........ | A01D 57/22 |
| | | | | 56/104 |
| 2019/0230859 A1 * | 8/2019 | Walker | ................... | A01D 34/44 |

FOREIGN PATENT DOCUMENTS

| | | | | | |
|---|---|---|---|---|---|
| CN | 107637269 | A | | 1/2018 | |
| CN | 207560787 | U | * | 7/2018 | ............ A01D 57/00 |
| CN | 109496541 | A | * | 3/2019 | ............ A01D 45/028 |
| CN | 213548404 | U | | 6/2021 | |
| CN | 217116954 | U | * | 8/2022 | ............ A01D 47/00 |
| CN | 114982470 | A | | 9/2022 | |
| CN | 115176587 | A | * | 10/2022 | ............ A01D 57/00 |
| CN | 217742309 | U | * | 11/2022 | ............ A01D 45/02 |
| CN | 217790400 | U | * | 11/2022 | ............ A01D 45/02 |
| EP | 3500083 | B1 | * | 12/2021 | ........... A01D 45/025 |

* cited by examiner

1

CORN EAR PICKING ROLLER STRUCTURE FOR STRENGTHENING STEM GRABBING

CROSS REFERENCE TO THE RELATED APPLICATIONS

This application is the continuation application of International Application No. PCT/CN2023/087258, filed on Apr. 10, 2023, which is based upon and claims priority to Chinese Patent Application No. 202210782371.4, filed on Jul. 5, 2022, the entire contents of which are incorporated herein by reference.

TECHNICAL FIELD

The present invention relates to the technical field of agricultural machinery, and in particular, to a corn ear picking roller structure for strengthening stem grabbing.

BACKGROUND

With the development of agricultural mechanization, the application of agricultural mechanization has become more and more extensive, and corn harvesters for harvesting corn have appeared in the actual planting industry. The corn harvester is an agricultural machine that completes multiple operations such as picking ears, stacking, and returning stems to the field at one time when the corn is ripe.

The common corn harvester uses the ear picking roller to perform ear picking. However, the conventional ear picking roller has an unstable corn ear picking effect, the grabbing capacity of the stems is weak, and the corn ears are easily damaged, consequently, the harvesting quality is reduced.

Therefore, it is necessary to provide a corn ear picking roller structure for strengthening stem grabbing with higher ear picking efficiency and better stem grabbing capacity.

SUMMARY

In order to solve the above technical problem, the present invention adopts the following technical solution.

A corn ear picking roller structure for strengthening stem grabbing includes a header, a seedling divider, a seedling pulling chain, a clamping chain, a seedling pressing plate, and an ear picking device, wherein the seedling divider is connected to a front end of the header, the seedling pulling chain is connected to the header and located on a lower side of the seedling divider, the clamping chain is connected to the header and located on a lower portion of the seedling pulling chain, the ear picking device is connected to the header and located on one side of the seedling divider, and the seedling pressing plate is connected to a top end of the ear picking device; the ear picking device includes a left ear picking roller and a right ear picking roller, the left ear picking roller and the right ear picking roller are each provided with an inequilateral multi-edge structure, an edge surface of each inequilateral multi-edge structure is provided with a groove edge structure, and each groove edge structure is provided with a strengthened stem grabbing type struc-ture.

Further, a width of an edge of the inequilateral multi-edge structure is 3 mm to 5 mm.

Further, the inequilateral multi-edge structures of the left ear picking roller and the right ear picking roller are matched with each other, an included angle between a groove edge of the inequilateral multi-edge structure on the left ear picking roller and an axis of the left ear picking roller is $\Phi$, an

2 included angle between a groove edge of the inequilateral multi-edge structure on the right ear picking roller and an axis of the right ear picking roller is $\Phi$, a height $h2$ of a groove edge of the edge surface that is of the inequilateral multi-edge structure and that has a large internal angle is 1 mm to 2 mm, and a height $h1$ of a groove edge of the edge surface that has a small internal angle is 2 mm to 3 mm.

Further, the strengthened stem grabbing type structure includes patterns distributed on edges of the left ear picking roller and the right ear picking roller, the patterns are in a groove edge staggered structure, and an included angle between the patterns and an axis of the ear picking rollers is $\Phi$, and the patterns are used to improve the grabbing effect of the edges on corn stems.

Further, the pattern has one of a first pattern structure, a second pattern structure, or a third pattern structure.

Further, the first pattern structure is symmetrical oblique groove edges uniformly arranged on edge surfaces of the left ear picking roller and the right ear picking roller, an included angle $\varphi$ between the oblique groove edge of the left ear picking roller and the axis of the ear picking roller is equal to $\theta$, and an included angle $\Phi$ between the oblique groove edge of the right ear picking roller and the axis of the ear picking roller is equal to $\theta$, wherein $\theta$ is an included angle between the stem and a cross section of the ear picking roller when the stem is grabbed by the ear picking roller and the top is pressed down by the seedling pressing plate in the ear picking process.

Further, the second pattern structure is groove edges that are uniformly arranged on the edge surfaces of the left ear picking roller and the right ear picking roller and that are staggered with each other, an included angle between the staggered groove edges is 90°, and included angles $\varphi$ between the staggered groove edges and the axis of the left ear picking roller, the staggered oblique lines, and the axis of the right ear picking roller each are equal to 45°.

Further, the third pattern structure is a group of parallel arc-shaped groove edge structures, an included angle between a middle tangent line of the arc-shaped groove edge on the edge surface of the left ear picking roller and the axis of the left ear picking roller is $\Phi$, and a radius of the arc-shaped groove edge structure is a distance between a stem grabbing point and a seedling pressing point when the stem is grabbed by the ear picking device and the top of the stem is pressed down by the seedling pressing plate; an included angle between a middle tangent line of the arc-shaped groove edge on the edge surface of the right ear picking roller and the axis of the right ear picking roller is $\Phi$, and a radius of the arc-shaped groove edge is a distance between a stem grabbing point and a seedling pressing point when the stem is grabbed by the ear picking device and the top of the stem is pressed down by the seedling pressing plate.

Further, two clamping chains are provided, front chain wheels of the two clamping chains are coaxially arranged with rear chain wheels of the seedling pulling chain, a rear chain wheel of one of the clamping chains is coaxially arranged with the left ear picking roller, and a rear chain wheel of the other clamping chain is coaxially arranged with the right ear picking roller.

The beneficial effects of the present invention are as follows.

The ear picking rollers are in a multi-edge opposite structure, the left ear picking roller and the right ear picking roller are not regular polygons, the included angles of the edges of the ear picking rollers are provided as one large angle and one small angle, and the two rolls adopt a large-angle-to-small-angle structure. In the process of clamping the stems by the ear picking rollers with the multi-edge heterogeneous structure, the stems can swing left and right at a high frequency, namely, an excitation force is applied to corn plants, the transmission of the excitation force is more reliable at a position that is closer to the heading position, the arrangement of patterns enables the stem clamping force to be improved, and the transmission of the excitation wave is reliable, so that the excitation ear picking is implemented, the ear picking effect is improved, the ear picking damage is reduced, the ear picking efficiency is improved, and the ear picking efficiency is improved by 15% to 35% compared with a conventional ear picking mode. After the edge of the ear picking roller is provided with the pattern structure, the stability of excitation wave transmission in the ear picking process is enhanced, and the reliability of excitation ear picking is improved; the edges of the ear picking rollers use a strengthened stem grabbing type, so that the stem grabbing capacity is improved; the ear picking gaps of the edges of the left and right ear picking roller are equal in the rotating process, the uniformity of the ear picking gaps is ensured, the problem that stems are extruded and broken is reduced, broken stems are prevented from accumulating, the blockage of an ear picking device is solved, and the stability of the operation process is ensured.

100: header; 1: seedling divider; 2: seedling pulling chain; 3: clamping chain; 4: seedling pressing plate; 5: ear picking device; 6: left ear picking roller; 7: right ear picking roller; 8: inequilateral multi-edge structure; 81: edge surface; 82: groove edge; 83: pattern; 831: first pattern structure; 832: second pattern structure; 833: third pattern structure; 9: large internal angle; and 10: small internal angle.

DETAILED DESCRIPTION OF THE EMBODIMENTS

Figure 1:
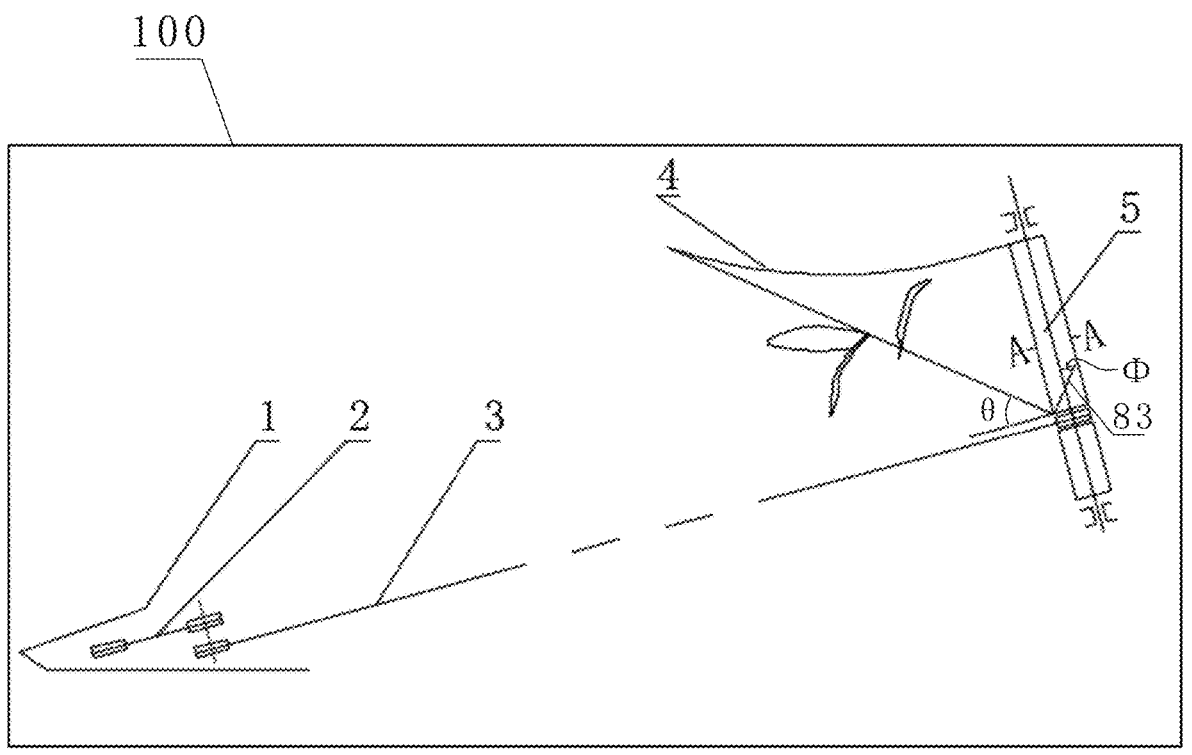
FIG. 1 is a schematic diagram of a vertical corn header of a corn ear picking roller structure for strengthening stem grabbing.
Figure 2:
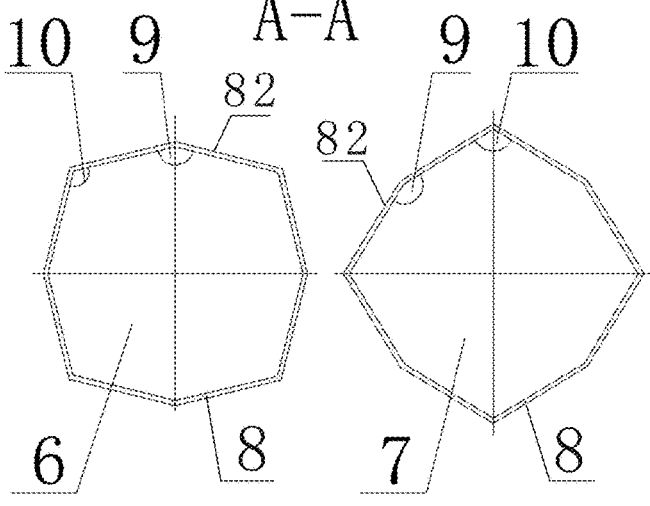
FIG. 2 is a sectional view along A-A in FIG. 1.
Figure 3:
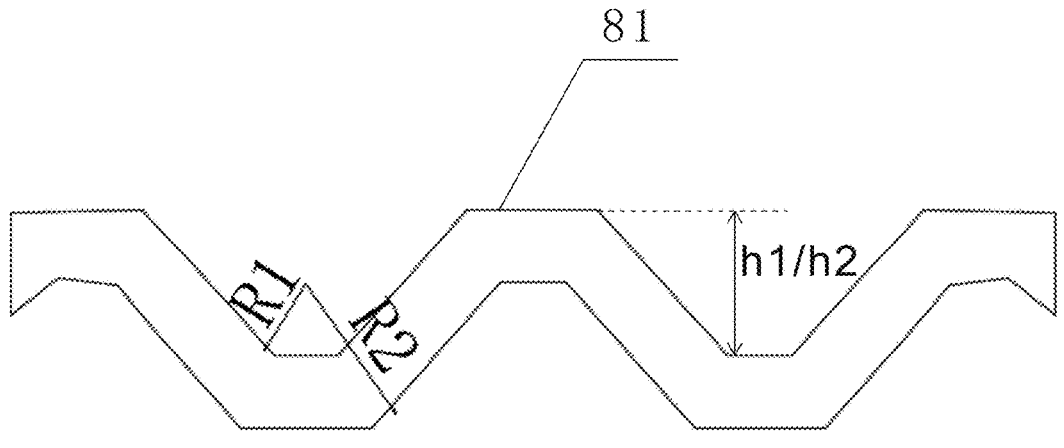
FIG. 3 is a schematic diagram of the cooperation of inequilateral multi-edge structures.
Figure 4:
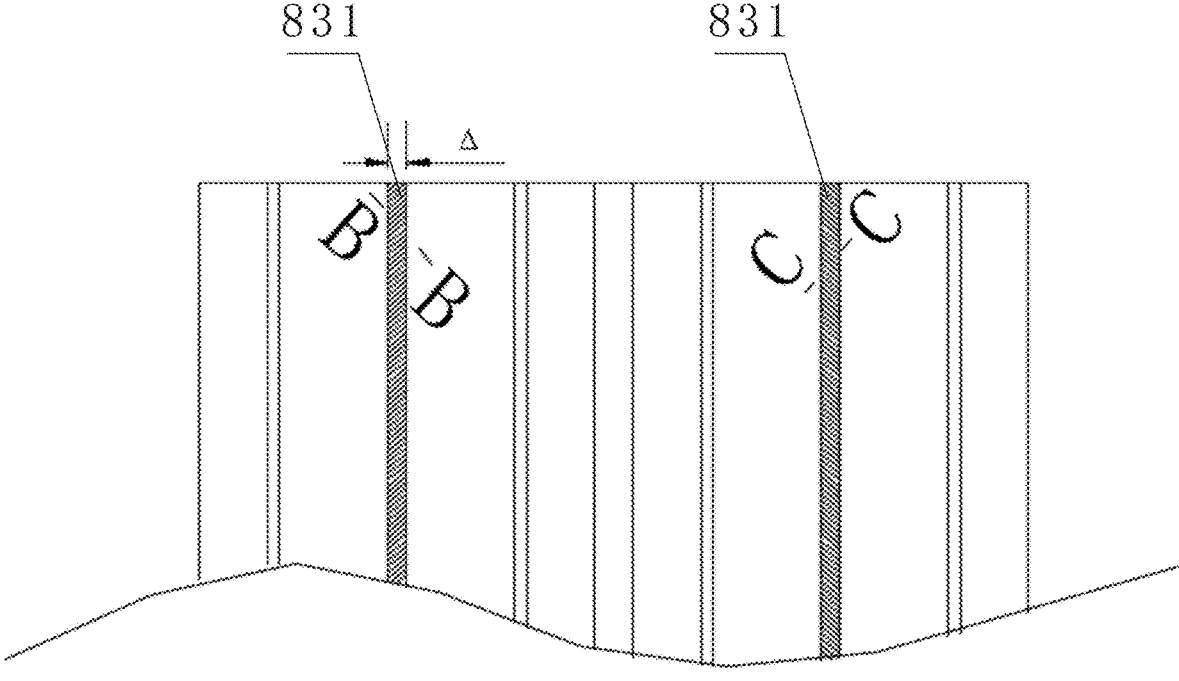
FIG. 4 is a schematic diagram of a structure of a first pattern structure.
Figure 5:
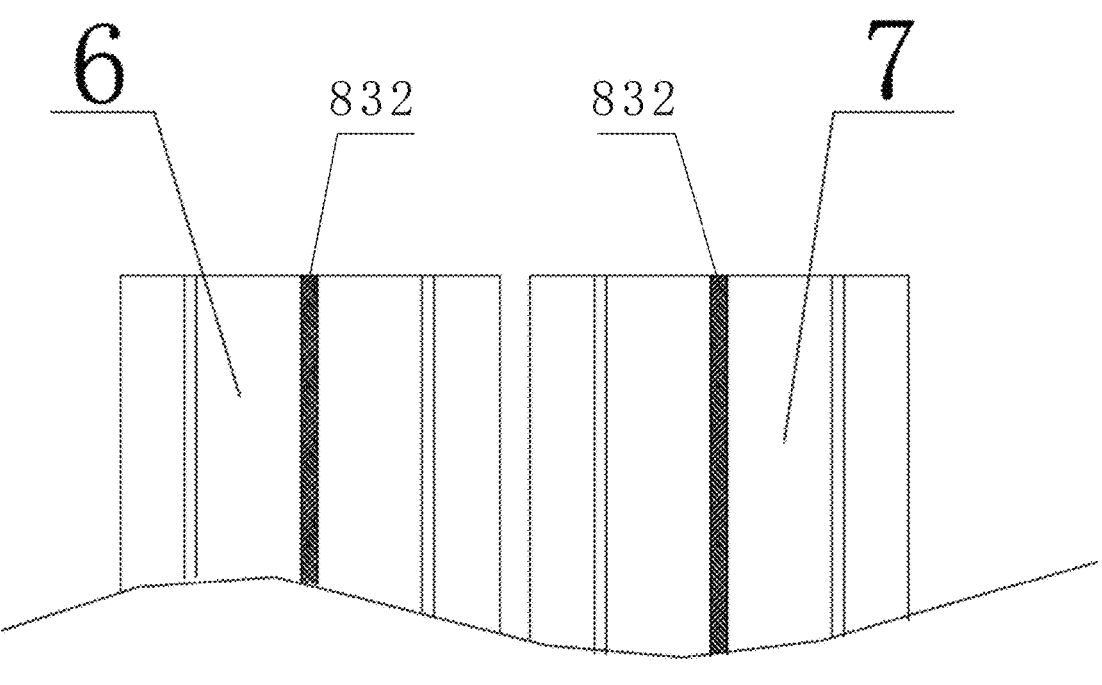
FIG. 5 is a schematic diagram of a structure of a second pattern structure.
Figure 6:
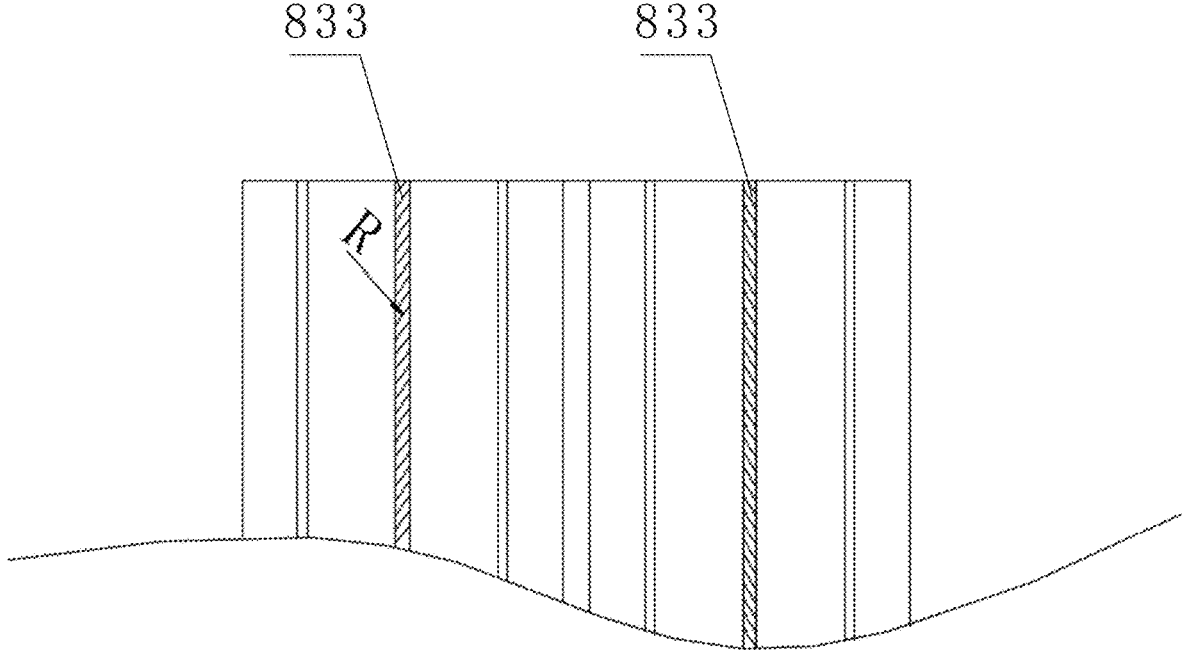
FIG. 6 is a schematic diagram of a structure of a third pattern structure.
Figure 7:
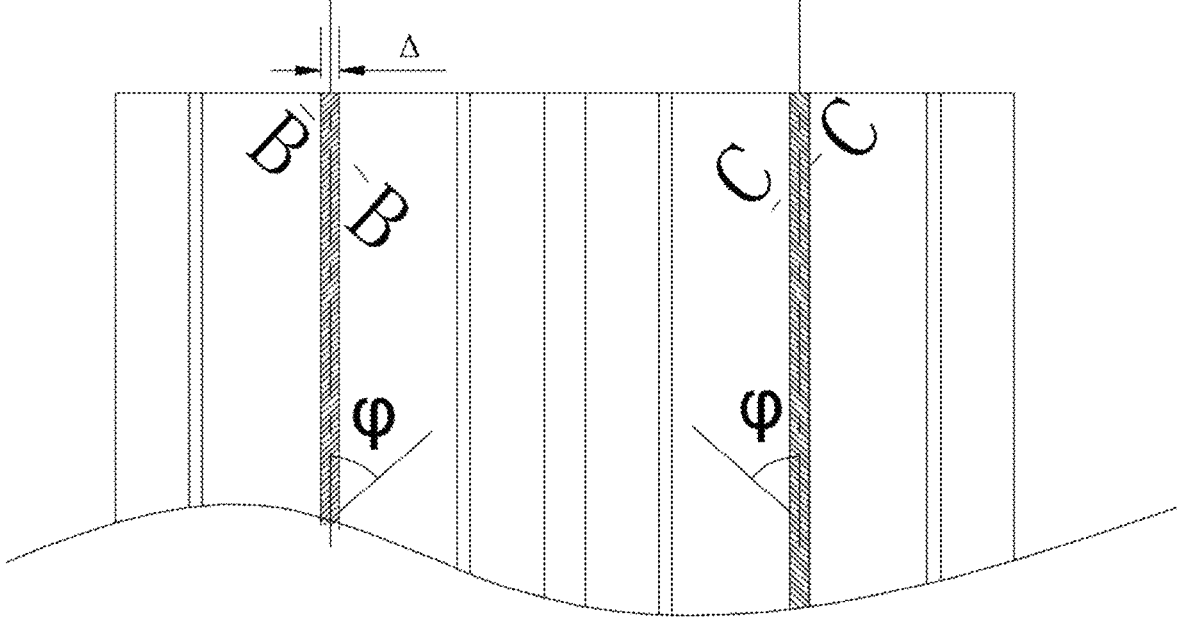
FIG. 7 is a partially enlarged view of FIG. 4.

The following clearly and completely describes the technical solutions in embodiments of the present invention with reference to FIGS. 1 to 7 in embodiments of the present invention. It is clear that the described embodiments are merely a part rather than all of embodiments of the present invention. Based on the embodiments of the present invention, all other embodiments obtained by those of ordinary skill in the art without creative efforts shall fall within the protection scope of the present invention.

EMBODIMENTS with reference to FIGS. 1 to 7, this embodiment provides a corn ear picking roller structure for strengthening stem grabbing, including a header 100, a seedling divider 1, a seedling pulling chain 2, a clamping chain 3, a seedling pressing plate 4, and an ear picking device 5, wherein the seedling divider 1 is connected to a front end of the header 100 and used to divide two ridges of corn plants; the seedling pulling chain 2 is connected to the header 100 and positioned on a lower side of the seedling divider 1, the clamping chain 3 is connected to the header 100 and positioned on a lower portion of the seedling pulling chain 2, and the seedling pulling chain and the clamping chain are driven by a drive device to convey corn stems; the ear picking device 5 is connected to the header 100 and positioned on one side of the seedling divider 1, and the seedling pressing plate 4 is connected to a top end of the ear picking device 5.

Two clamping chains 3 are provided, front chain wheels of the two clamping chains 3 are coaxially arranged with rear chain wheels of the seedling pulling chain 2, a rear chain wheel of one of the clamping chains 3 is coaxially arranged with the left ear picking roller 6, and a rear chain wheel of the other clamping chain 3 is coaxially arranged with the right ear picking roller 7, so that an overall structure is more compact while power driving is completed.

Further, the ear picking device 5 includes a left ear picking roller 6 and a right ear picking roller 7, the left ear picking roller 6 and the right ear picking roller 7 are both provided with inequilateral multi-edge structures 8, the multi-edge structures of the left ear picking roller and the right ear picking roller are unequal in radius, the edge surfaces 81 of the inequilateral multi-edge structures 8 are provided with groove edge structures 82, the widths of the edges of the inequilateral multi-edge structures 8 are 3 mm to 5 mm, and the edge width of the inequilateral multi-edge structures 8 in this embodiment is preferably 4 mm; the inequilateral multi-edge structure 8 and the groove edge structure 82 of the left ear picking roller 6 and the right ear picking roller 7 are matched with each other, namely, a convex edge of the left ear picking roller 6 is matched with a groove of the right ear picking roller 7, and a groove of the left ear picking roller 6 is matched with a convex edge of the right ear picking roller 7, so that the stability of grabbing corn plants is improved. The convex edge radius and the groove radius of the left ear picking roller and the right ear picking roller described in this embodiment are R1 and R2, respectively, wherein $R2-R1=(1/3-1/2)d$, where d is a diameter of the stem. By setting the parameter limit between the convex edge and the groove, the consistency of the ear picking gap is ensured, the problem that stems are extruded and broken is reduced, the blockage of an ear picking device is solved, and the stability of the operation process is ensured.

Further, an included angle between a groove edge 82 of the inequilateral multi-edge structure on the left ear picking roller and an axis of the left ear picking roller is Φ, an included angle between a groove edge 82 of the inequilateral multi-edge structure on the right ear picking roller and an axis of the right ear picking roller is Φ, a height h2 of a groove edge 82 of the edge surface 81 that is of the inequilateral multi-edge structure and that has a large internal angle 9 is 1 mm to 2 mm, and a height h1 of a groove edge 82 of the edge surface 81 that has a small internal angle 10 is 2 mm to 3 mm.

In this embodiment, the left ear picking roller 6 and the right ear picking roller 7 are both provided with six edge structures, and the widths of the edges of the six edge structures are 4 mm.

Further, a strengthened stem grabbing type structure is provided on one side of the groove edge structure 82, the strengthened stem grabbing type structure includes patterns 83 distributed on edges of the left ear picking roller 6 and the right ear picking roller 7, the patterns 83 are in a groove edge staggered structure, and an included angle between the patterns 83 and an axis of the ear picking rollers is Φ, and the patterns 83 are used to improve the grabbing effect of the edges on corn stems.

The pattern has one of a first pattern structure 831, a second pattern structure 832, or a third pattern structure 833.

The first pattern structure 831 is symmetrical oblique groove edges uniformly arranged on edge surfaces of the left ear picking roller and the right ear picking roller, an included angle φ between the oblique groove edge of the left ear picking roller and the axis of the ear picking roller is equal to θ, and an included angle φ between the oblique groove edge of the right ear picking roller and the axis of the ear picking roller is equal to θ, wherein θ is an included angle between the stem and a cross section of the ear picking roller when the stem is grabbed by the ear picking roller and the top is pressed down by the seedling pressing plate in the ear picking process.

Further, the second pattern structure 832 is groove edges that are uniformly arranged on the edge surfaces of the left ear picking roller and the right ear picking roller and that are staggered with each other, an included angle between the staggered groove edges is 90°, included angles between the staggered groove edges and the axis of the left ear picking roller, the staggered oblique lines, and the axis of the right ear picking roller are all φ, and φ is equal to 45°, so that an included angle between two intersecting groove edges is equal to 90°.

The third pattern structure 833 is a group of parallel arc-shaped groove edge structures, an included angle between a middle tangent line of the arc-shaped groove edge on the edge surface of the left ear picking roller and the axis of the left ear picking roller is Φ, and a radius of the arc-shaped groove edge structure is a distance between a stem grabbing point and a seedling pressing point when the stem is grabbed by the ear picking device and the top of the stem is pressed down by the seedling pressing plate; an included angle between a middle tangent line of the arc-shaped groove edge on the edge surface of the right ear picking roller and the axis of the right ear picking roller is Φ, and a radius of the arc-shaped groove edge is a distance between a stem grabbing point and a seedling pressing point when the stem is grabbed by the ear picking device and the top of the stem is pressed down by the seedling pressing plate.

The setting of the pattern structure can increase the friction force of the groove edge structure on the stems, and further improve the grabbing capacity of the stems, and thus improving the efficiency of ear picking.

The ear picking rollers of the corn ear picking roller structure for strengthening stem grabbing disclosed by the present invention are in a multi-edge opposite structure, the left ear picking roller and the right ear picking roller are not regular polygons, the included angles of the edges of the ear picking rollers are provided as one large angle and one small angle, and the two rolls adopt a large-angle-to-small-angle structure. In the process of clamping the stems by the ear picking rollers with the multi-edge heterogeneous structure, the stems can swing left and right at a high frequency, namely, an excitation force is applied to corn plants, and the transmission of the excitation force is more reliable at a position that is closer to the heading position; however, no pattern is arranged in the conventional technology, which causes the stem to slide out during the excitation process and thus affecting the ear picking effect; therefore, the reliability is not enough. The arrangement of patterns enables the stem clamping force to be improved, and the transmission of the excitation wave is reliable, so that the excitation ear picking is implemented, the ear picking effect is improved, the ear picking damage is reduced, the ear picking efficiency is improved, and the ear picking efficiency is improved by 15% to 35% compared with a conventional ear picking mode. After the edge of the ear picking roller is provided with the pattern structure, the stability of excitation wave transmission in the ear picking process is enhanced, and the reliability of excitation ear picking is improved; the edges of the ear picking rollers use a strengthened stem grabbing type, so that the stem grabbing capacity is improved; the ear picking gaps of the edges of the left and right ear picking roller are equal in the rotating process, the uniformity of the ear picking gaps is ensured, the problem that stems are extruded and broken is reduced, broken stems are prevented from accumulating, the blockage of an ear picking device is solved, and the stability of the operation process is ensured.

The above description of the disclosed embodiments enables those skilled in the art to implement or use the present invention. Various modifications to the foregoing embodiments will be readily apparent to those skilled in the art, and the generic principles defined herein may be applied to other embodiment without departing from the spirit or scope of the present invention. Thus, the present invention is not intended to be limited to these embodiments shown herein but is to be accorded the broadest scope consistent with the principles and novel features disclosed herein.

What is claimed is:

1. A corn ear picking roller structure for strengthening stem grabbing, comprising: a header, a seedling divider, a seedling pulling chain, a clamping chain, a seedling pressing plate, and an ear picking device, wherein the seedling divider is connected to a front end of the header, the seedling pulling chain is connected to the header and located on a lower side of the seedling divider, the clamping chain is connected to the header and located on a lower portion of the seedling pulling chain, the ear picking device is connected to the header and located on one side of the seedling divider, and the seedling pressing plate is connected to a top end of the ear picking device; the ear picking device comprises a left ear picking roller and a right ear picking roller, wherein each of the left ear picking roller and the right ear picking roller is provided with an inequilateral multi-edge structure, an edge surface of the inequilateral multi-edge structure is provided with a groove edge structure, and the groove edge structure is provided with a strengthened stem grabbing type structure;

the inequilateral multi-edge structure of the left ear picking roller and the inequilateral multi-edge structure of the right ear picking roller are matched with each other, an included angle between a groove edge of the inequilateral multi-edge structure of the left ear picking roller and an axis of the left ear picking roller is Φ, an included angle between a groove edge of the inequilateral multi-edge structure of the right ear picking roller and an axis of the right ear picking roller is Φ, a height h2 of a groove edge of the edge surface that is of the inequilateral multi-edge structure and that has a large internal angle is 1 mm to 2 mm, and a height h1 of a groove edge of the edge surface that has a small internal angle is 2 mm to 3 mm;

a width of the groove edge of the inequilateral multi-edge structure is 3 mm to 5 mm; and the strengthened stem grabbing type structure comprises patterns distributed on edges of the left ear picking roller and the right ear picking roller, wherein the patterns are in the groove edge structure, and an included angle between the patterns and each of the axis of the left ear picking roller and the axis of the right ear picking roller is $\Phi$, and the patterns are used to improve a grabbing effect of edges on corn stems.

2. The corn ear picking roller structure for strengthening stem grabbing according to claim 1, wherein the pattern has a first pattern structure, a second pattern structure, or a third pattern structure.

3. The corn ear picking roller structure for strengthening stem grabbing according to claim 2, wherein the first pattern structure is symmetrical oblique groove edges uniformly arranged on edge surfaces of the left ear picking roller and the right ear picking roller, an included angle $\varphi$ between the oblique groove edge of the left ear picking roller and the axis of the left ear picking roller is equal to $\theta$, and an included angle $\varphi$ between the oblique groove edge of the right ear picking roller and the axis of the right ear picking roller is equal to $\theta$, wherein $\theta$ is an included angle between a stem and a cross section of the left ear picking roller or the right ear picking roller when the stem is grabbed by the left ear picking roller or the right ear picking roller and a top of the stem is pressed down by the seedling pressing plate in an ear picking process.

4. The corn ear picking roller structure for strengthening stem grabbing according to claim 2, wherein the second pattern structure is groove edges, wherein the groove edges are uniformly arranged on edge surfaces of the left ear picking roller and the right ear picking roller and are staggered with each other, an included angle between the groove edges staggered with each other is 90°, and included angles $\varphi$ between the groove edges staggered with each other and the axis of the left ear picking roller, staggered oblique lines, and the axis of the right ear picking roller each are equal to 45°.

5. The corn ear picking roller structure for strengthening stem grabbing according to claim 2, wherein the third pattern structure is a group of parallel arc-shaped groove edge structures, an included angle between a middle tangent line of an arc-shaped groove edge structure on an edge surface of the left ear picking roller and the axis of the left ear picking roller is $\Phi$, and a radius of the arc-shaped groove edge structure on the edge surface of the left ear picking roller is a distance between a stem grabbing point and a seedling pressing point when the stem is grabbed by the ear picking device and a top of the stem is pressed down by the seedling pressing plate; an included angle between a middle tangent line of the arc-shaped groove edge structure on an edge surface of the right ear picking roller and the axis of the right ear picking roller is $\Phi$, and a radius of the arc-shaped groove edge structure on the edge surface of the right ear picking roller is the distance between the stem grabbing point and the seedling pressing point when the stem is grabbed by the ear picking device and the top of the stem is pressed down by the seedling pressing plate.

* * * * *